(12) United States Patent
Weigl

(10) Patent No.: US 10,323,649 B2
(45) Date of Patent: Jun. 18, 2019

(54) ELECTRICALLY DRIVEN PUMP

(71) Applicant: CONTINENTAL AUTOMOTIVE GMBH, Hannover (DE)

(72) Inventor: Manfred Weigl, Sinzing (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/495,140

(22) Filed: Apr. 24, 2017

(65) Prior Publication Data

US 2017/0227017 A1  Aug. 10, 2017

Related U.S. Application Data

(63) Continuation of application No. PCT/EP2015/074398, filed on Oct. 21, 2015.

(30) Foreign Application Priority Data

Oct. 30, 2014  (DE) .................. 10 2014 222 241

(51) Int. Cl.
*F04D 29/42* (2006.01)
*F02M 25/08* (2006.01)
(Continued)

(52) U.S. Cl.
CPC .......... *F04D 29/4206* (2013.01); *F02B 37/04* (2013.01); *F02B 39/10* (2013.01);
(Continued)

(58) Field of Classification Search
CPC .... F04D 13/026; F04D 13/0646; F04D 17/08; F04D 25/06; F04D 29/049; F04D 29/059;
(Continued)

(56) References Cited

U.S. PATENT DOCUMENTS 2,780,175 A * 2/1957 Thoren .................. F02M 37/08
  137/543.13
3,803,432 A * 4/1974 Laing ........................ F04D 3/00
  310/90
(Continued)

FOREIGN PATENT DOCUMENTS

CN  103872833 A  6/2014
DE  3712567 A1  10/1987
(Continued)

OTHER PUBLICATIONS

International Search Report and Written Opinion dated Jan. 21, 2016 from corresponding International Patent Application No. PCT/EP2015/074398.
(Continued)

*Primary Examiner* — Long T Tran

(57) ABSTRACT

An electrically driven pump for gases or gas mixtures having a pump housing and a motor housing. A radial pump having a pump impeller is formed in the pump housing, and the pump impeller is connected to a drive shaft which extends through a wall of the pump housing into the motor housing. At least one air gap is formed between the drive shaft and the wall of the pump housing. A pressure side is formed in the pump housing, and is arranged in the outer radial region of the pump impeller. An opening through the pump housing is formed in the region of the pressure side, and the opening connects the interior of the pump housing to the interior of the motor housing, such that the pressure prevailing on the pressure side may propagate into the interior of the motor housing.

7 Claims, 5 Drawing Sheets

(51) Int. Cl.

| | | |
|---|---|---|
| *F04D 25/06* | (2006.01) | |
| *F04D 29/059* | (2006.01) | |
| *F04D 29/70* | (2006.01) | |
| *F02B 37/04* | (2006.01) | |
| *F02B 39/10* | (2006.01) | |
| *F04D 17/08* | (2006.01) | |
| *F04D 27/00* | (2006.01) | |
| *F04D 29/053* | (2006.01) | |
| *F04D 29/28* | (2006.01) | |

(52) U.S. Cl.
 CPC .......... *F02M 25/08* (2013.01); *F02M 25/089* (2013.01); *F02M 25/0818* (2013.01); *F04D 17/08* (2013.01); *F04D 25/06* (2013.01); *F04D 25/0606* (2013.01); *F04D 27/009* (2013.01); *F04D 29/053* (2013.01); *F04D 29/059* (2013.01); *F04D 29/28* (2013.01); *F04D 29/4226* (2013.01); *F04D 29/701* (2013.01); *Y02T 10/144* (2013.01)

(58) Field of Classification Search
 CPC ...... F04D 29/181; F04D 29/28; F04D 29/321; F04D 3/00; F04D 9/003
 See application file for complete search history.

(56) References Cited

U.S. PATENT DOCUMENTS

| | | | | |
|---|---|---|---|---|
| 5,102,308 | A * | 4/1992 | Bordelon | F04D 3/00 415/110 |
| 5,253,986 | A * | 10/1993 | Bond | F04D 29/0413 415/106 |
| 5,525,048 | A * | 6/1996 | Tuckey | F02M 37/0041 417/423.15 |
| 6,238,191 | B1 * | 5/2001 | Strohl | F02M 37/048 137/517 |
| 7,181,928 | B2 | 2/2007 | de Larminat | |
| 7,265,466 | B2 * | 9/2007 | Yamashita | H02K 1/148 310/261.1 |
| 7,456,536 | B2 * | 11/2008 | Tanaka | H02K 5/1732 310/90 |
| 7,575,410 | B2 * | 8/2009 | Uchida | F01N 3/22 415/36 |
| 2005/0151440 | A1 | 7/2005 | Yamashita et al. | |
| 2006/0024176 | A1 * | 2/2006 | Ikeya | F02M 37/048 417/366 |
| 2006/0219231 | A1 | 10/2006 | Uchida et al. | |
| 2007/0273228 | A1 | 11/2007 | Tanaka et al. | |

FOREIGN PATENT DOCUMENTS

| | | |
|---|---|---|
| DE | 10325077 A1 | 10/2004 |
| DE | 102010054668 A1 | 6/2012 |
| FR | 2710371 A1 | 3/1995 |
| JP | S5189297 A | 8/1976 |
| JP | S537803 A | 1/1978 |
| JP | S5963400 A | 4/1984 |
| JP | S62-243999 A | 10/1987 |
| JP | H08326685 A | 12/1996 |
| JP | 2006283702 A | 10/2006 |
| JP | 2010144521 A | 7/2010 |
| JP | 2013545933 A | 12/2013 |
| KR | 10-2001-0023891 A | 3/2001 |
| KR | 10-2014-0040080 A | 4/2014 |
| WO | WO9913223 A1 | 3/1999 |
| WO | WO2012080177 A1 | 6/2012 |

OTHER PUBLICATIONS

German Office Action dated Apr. 14, 2015 for corresponding German application No. 10 2014 222 241.9.
English translation of abstract of JPS62243999A.
Office Action dated Sep. 4, 2018 from corresponding CN application No. 201580059338.7.

* cited by examiner

ELECTRICALLY DRIVEN PUMP

CROSS-REFERENCE TO RELATED APPLICATIONS

This application claims the benefit of PCT Application PCT/EP2015/074398, filed Oct. 21, 2015, which claims priority to German Application DE 10 2014 222 241.9, filed Oct. 30, 2014. The disclosures of the above applications are incorporated herein by reference.

FIELD OF THE INVENTION

The invention relates to an electrically driven pump for gases or gas mixtures having a pump housing and a motor housing, wherein a radial pump having a pump impeller is formed in the pump housing, wherein the pump impeller is connected to a drive shaft which extends through a wall of the pump housing into the motor housing, where the drive shaft is connected to a rotor of an electric motor, wherein at least one air gap is formed between the drive shaft and the wall of the pump housing, wherein a pump inlet, which is arranged in the central region of the pump impeller, is formed in the pump housing, and wherein a pressure side is formed in the pump housing, which pressure side is arranged in the outer radial region of the pump impeller.

BACKGROUND OF THE INVENTION

Numerous measures have been introduced in the past decades to reduce the emissions of harmful substances originating from motor vehicles. One of these measures involves the use of fuel tank systems, in which a fuel tank is connected to a storage element for the temporary storage of hydrocarbons. The refueling of motor vehicles with hydrocarbon-based fuels is associated with the outgassing of hydrocarbons from the fuel, in conjunction with which the hydrocarbons are not meant to be released into the atmosphere. Increased outgassing of hydrocarbons from the fuel also takes place at high temperatures or when traveling over uneven ground, and it is thus necessary to take effective steps to ensure that these hydrocarbons do not escape into the atmosphere. In the case of hybrid vehicles in particular, in which the internal combustion engine remains completely at a standstill over long distances, the outgassed hydrocarbons must be kept effectively in temporary storage before subsequently being burned for the purpose of restarting the internal combustion engine Fuel tank systems, which consist of a fuel tank and a storage element for the temporary storage of hydrocarbons, have proven themselves to be suitable for this purpose, wherein the fuel tank and the storage element are interconnected in such a way that the hydrocarbons, which outgas from a fuel that is present in the fuel tank, are stored in the storage element, wherein the storage element is connected to a first line, via which fresh air may be supplied to the storage unit, and the storage element is connected to a second line, which connects the storage element to an intake system of the internal combustion engine and via which the fresh air enriched with hydrocarbons may be supplied from the storage element to the intake system. The supply of the fresh air through the storage element takes place with the help of an electrically driven purge air pump. The storage element may be purged periodically with fresh air in this way, and the stored hydrocarbons are supplied to the intake system of an internal combustion engine, wherein the internal combustion engine is supplied with fresh air via the air filter and the intake line. The hydrocarbons that are outgassed from the fuel tank are thus burned in the internal combustion engine, and the escape of the hydrocarbons into the atmosphere is reliably prevented. A purge air pump, which may be configured as a radial pump, is used according to the prior art to supply the hydrocarbons from the storage element to the intake system. This purge air pump must function reliably at relatively high speeds of rotation, ideally for the entire lifetime of the motor vehicle, which imposes special requirements on the sealing elements between moving parts of the purge air pump.

SUMMARY OF THE INVENTION

One object of the present invention is thus to propose a cost-effective electrically driven pump for gases or gas mixtures, which operates faultlessly over a long period of service.

This object is accomplished by an electrically driven pump for gases or gas mixtures according to the independent apparatus claim.

As a result of the fact that, in the region of the pressure side, an opening is formed through the pump housing, which opening connects the interior of the pump housing to the interior of the motor housing, so that the pressure prevailing on the pressure side may be propagated into the interior of the motor housing, the pressure in the interior of the motor housing is higher than the pressure in the central region of the pump impeller, so that a gas flow, driven by the pressure differential, arises through the air gap from the inner region of the motor housing along the drive shaft towards the central region of the pump impeller. No liquid or solid components, which have found their way into the pump housing through the pump inlet together with the intake gas or gas mixture, are prevented by this gas flow from penetrating into the motor housing. This sealing of the drive shaft in the region of its passage through a wall of the pump housing takes place according to the invention without any physical sealing element simply by the advantageous embodiment and utilization of the pressure conditions between the interior of the pump housing and the interior of the motor housing. Since no physical sealing elements of any kind, such as Simmer rings, are required for sealing the rotating drive shaft, an extremely durable and long-lasting electrically driven pump for gases or gas mixtures is provided. Since the gas flow through the air gap is only very small, in comparison with the entire gas flow supplied by the pump, the pump loses only very little performance because of its inventive design, which is of secondary importance with regard to the immense benefit of the wear-free sealing of the drive shaft In a further development, the drive shaft is mounted in a first ball bearing, which is arranged in the wall of the pump housing, wherein the air gap extends between the balls of the first ball bearing. The ball bearing permits the largely unimpeded rotation of the drive shaft, wherein the pressure differential between the interior of the motor housing and the interior of the pump housing in the central region of the pump impeller produces a continuous gas flow, which passes from the interior of the motor housing through the first ball bearing to the interior of the pump housing and prevents the ingress of liquid and/or solid bodies into the interior of the motor housing.

In a subsequent further development, an annular disc is formed in or on the wall of the pump housing and around the drive shaft, wherein an air gap is formed between the drive shaft and the annular disc. The air gap between the drive shaft and the annular disc may be made very small, without this resulting in friction between the drive shaft and the annular disc. The continuous gas flow from the interior of the motor housing to the interior of the pump housing is thus very small, as a result of which the efficiency of the electrically driven pump is minimally impaired by this gas flow.

In one embodiment of the invention, the opening is formed as a bore through a wall of the pump housing. This bore is present in the wall of the pump in the region of the pressure side, as a result of which no moving parts are in contact with the bore, which is also the case if the opening is formed as a bypass. In both cases, it is advantageous if the opening is provided with a filter element, which prevents the ingress of liquids or solid bodies into the interior of the motor housing.

In a further development of the invention, the electrically driven pump is formed as a purge air pump. The longevity of the inventive purge air pump has been found to be advantageous, particularly in its application in a motor vehicle. For this purpose, the purge air pump may be a component part of a fuel tank system in a motor vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
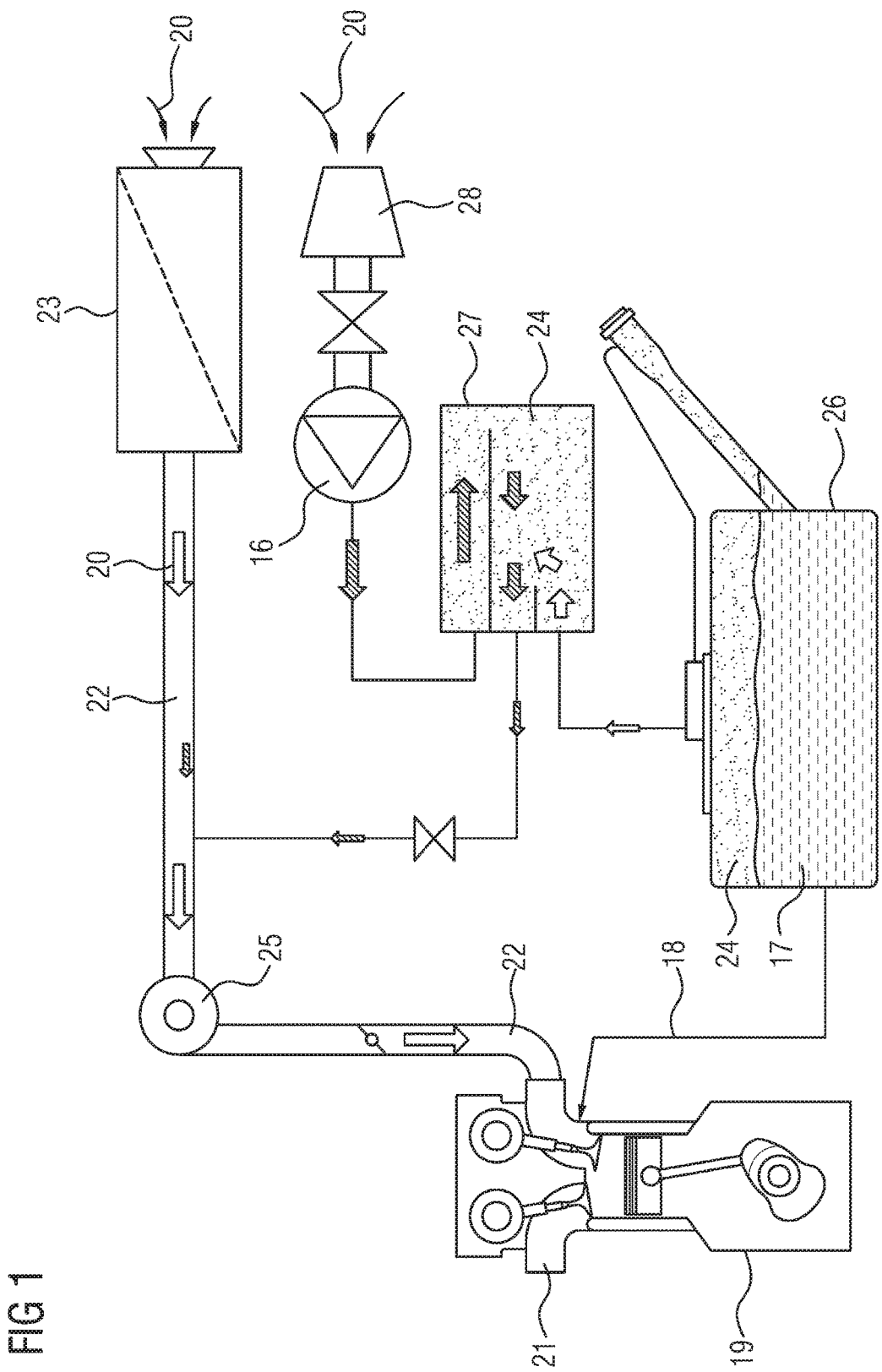
FIG. 1 is a diagram of an internal combustion engine with a fuel tank system having an electrically driven pump, according to embodiments of the present invention.

FIG. 1 depicts an internal combustion engine 19 with a fuel tank system. The internal combustion engine 19 has an exhaust system 21 and an intake system 22. For the recovery of the kinetic energy contained in the exhaust gas, the exhaust system 21 is equipped with a turbocharger 25, which is able to compress the intake air in the intake system 22. The internal combustion engine 19 is supplied with fresh air 20 via the intake system 22. Starting from the fresh air side, fresh air 20 is led via an intake air filter 23 into the intake system 22 and is compressed, as appropriate, with the exhaust turbocharger 25 or with a compressor, and is then supplied to the combustion chamber of the internal combustion engine 19. In addition, fuel 17 from the fuel tank 26 is supplied to the internal combustion engine 19 via a fuel line 18.

FIG. 1 further depicts the fuel tank system with the fuel tank 26 and a storage element 27 for the temporary storage of hydrocarbons 24. The fuel tank 26 and the storage element 27 are interconnected in such a way that the hydrocarbons 24, which outgas from a fuel 17 that is present in the fuel tank 26, is stored in the storage element 27. The storage element 27 may be configured as an activated carbon storage element, for example. An activated carbon storage element is a closed canister, inside which mostly granular carbon is arranged in such a way that the hydrocarbons 24 that are intended to be stored attach themselves to the carbon. The storage element 26 has only a limited storage capacity, however, such that the storage element 26 must be emptied at regular intervals by drawing in fresh air 20, for example via a purge air filter 28, and by sucking it or compressing it into the storage element 27 via a line with the help of a purge air pump 16. The fresh air 20 flows through the activated carbon in the storage element 27 and in so doing takes up hydrocarbons 24, after which the fresh air 20 enriched with the hydrocarbons 24 is conveyed along further lines to the intake system 22. In the intake system 22, the fresh air 20 enriched with the hydrocarbons 24 is mixed with the fresh air 20, which is drawn in via the intake air filter 23. The hydrocarbons 24 are able in this way to be supplied to the internal combustion engine 19, where the hydrocarbons 24 are burned in the combustion chambers of the internal combustion engine 19. Since the fuel tank system contains volatile hydrocarbons 24, it is necessary to assure the sustainable function of the entire fuel tank system. An important component of the fuel tank system is the purge air pump 16, which is represented here in more detail in the following figures, for example for the inventive electrically driven pump for gases or gas mixtures.

Figure 2:
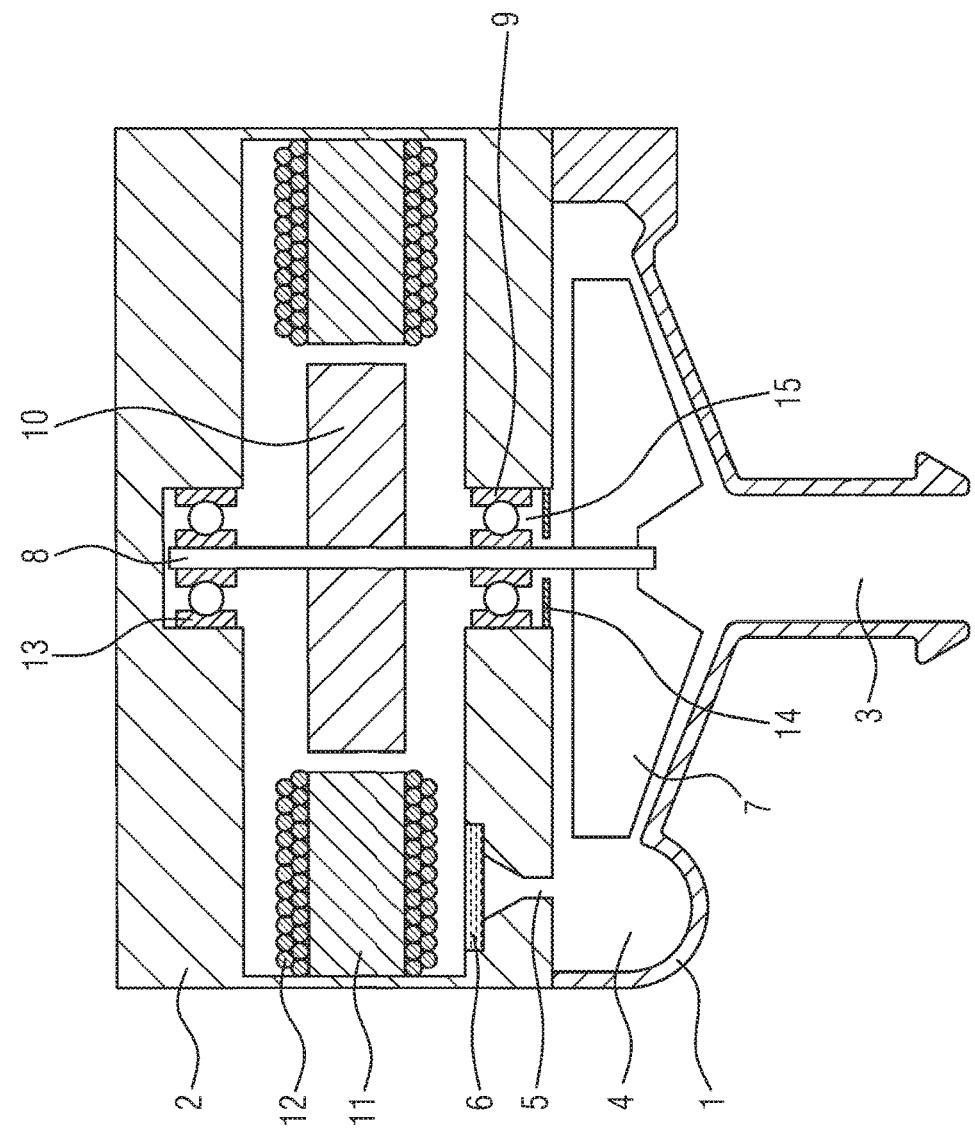
FIG. 2 is a section view of an electrically driven pump, according to embodiments of the present invention.

FIG. 2 depicts an electrically driven pump 16 for gases or gas mixtures. The pump has a pump housing 1 and a motor housing 2. Both the pump housing 1 and the motor housing 2 are sealed in a gas-tight manner. In the case of the pump housing 1, however, the pump inlet 3 and a pump outlet, not represented here, that is present on the pressure side 4 are, of course, exempted from the gastight sealing. A radial pump with a pump impeller 7 is formed inside the pump housing 1. The pump impeller 7 is connected to a drive shaft 8, which projects through a wall of the pump housing 1 into the motor housing 2. In the region of the passage of the drive shaft 8 through the wall of the pump housing 1, the drive shaft 8 is rotatably mounted with a first ball bearing 9. Furthermore, the drive shaft 8 is also mounted in the motor housing 2 with a second ball bearing 13. The drive shaft 8 is connected inside the motor housing 2 to the rotor 10 of an electric motor. The electric motor represented here is an electronically commutated, brushless electric motor. In electric motors of this type, the rotor 10 is equipped with permanent magnetic elements, and the stator 11 is provided with stator windings 12. The stator windings 12 constitute electrical coils. The stator windings are energized with a correspondingly commuted direct current, so that they attract permanent magnets that are integrated in the rotor 10, as a result of which the rotor is caused to rotate.

At least one air gap 15 is formed between the drive shaft 8 and the wall of the pump housing 1. Formed in addition in the pump housing 1 is the pump inlet 3, which is situated in the central region of the pump impeller 7. The gas flow is sucked into the pump housing 1 via this pump inlet 3 and is conveyed by the rotation of the pump impeller 7 to the pressure side 4 formed in the pump housing 1. The pressure side 4 is situated in the outer radial region of the pump impeller 7. An opening 5, which passes through the pump housing 1 in the region of a wall and, in so doing, connects the interior of the pump housing 1 to the interior of the motor housing 2, may be seen in the region of the pressure side 4. The pressure prevailing on the pressure side 4 is propagated into the interior of the motor housing 2 through this opening 5. Since the prevailing pressure in the central region of the pump impeller 7 is lower than on the pressure side 4 of the pump and thus in the interior of the motor housing 2, a gas flow will be formed through the air gap 15. The air gap 15 in this illustrative example may be formed, for example, through openings between the individual balls of the first ball bearing 9. The pressure equalization across the ball bearing 9 ensures that liquid components or solid components in the gas flow, which is aspirated through the pump inlet 3, are not able to enter into the interior of the motor housing 2. The opening 5 between the pressure side 4 of the pump housing and the interior of the motor housing 2 is covered with a filter element 6. This filter element 6 also ensures that liquid or solid components, which are present in the gas flow, are not able to penetrate into the interior of the motor housing. It should be noted that the filter element 6 is a purely static component part, which is not subjected to movement of any kind, as a result of which no mechanical wear takes place on the filter element 6. The moving parts of the electrically driven pump 16, such as the drive shaft 8 or the ball bearing 9, for example, are not surrounded by physically embodied sealing elements, such that no wear takes place. An annular disc 14, which is connected to the wall of the pump housing and is disposed around the drive shaft 8, may be provided in order to form an even finer air gap 15, wherein an air gap 15 is formed between the drive shaft and the annular disc 14. This air gap 15 may be kept very small, without this resulting in any mechanical contacts between the moving drive shaft 8 and the annular disc 14. The reduction in performance or the reduction in efficiency of the electrically driven pump as a result of the branching off of a partial gas flow for sealing the shaft is thus extremely low.

Figure 3:
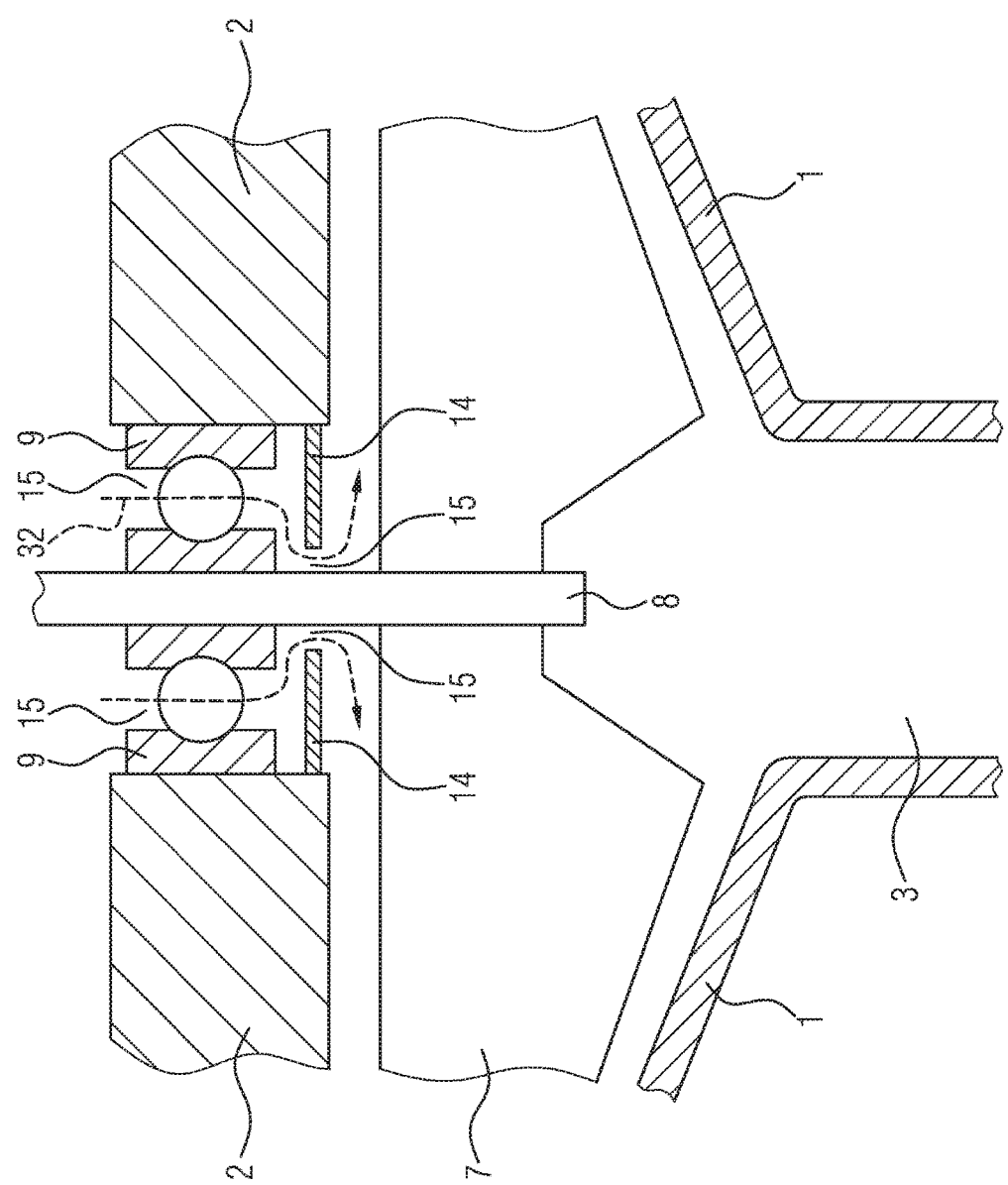
FIG. 3 is an enlarged section view of a portion of an electrically driven pump, according to embodiments of the present invention.

FIG. 3 depicts the passage of the drive shaft 8 through the pump housing 1 in a detailed representation. The drive shaft 8, which is mounted in the first ball bearing 9, may be seen. The first ball bearing 9 is in turn connected to the pump housing 1. Since the prevailing pressure in the interior of the pump housing 1 in the region of the pump inlet 3 is lower than in the interior of the motor housing 2, a partial gas flow 32 develops, which moves through the air gap 15 and for that reason ensures that liquid or solid components in the aspirated gas or gas mixture are not able to penetrate into the interior of the motor housing 2.

Figure 4:
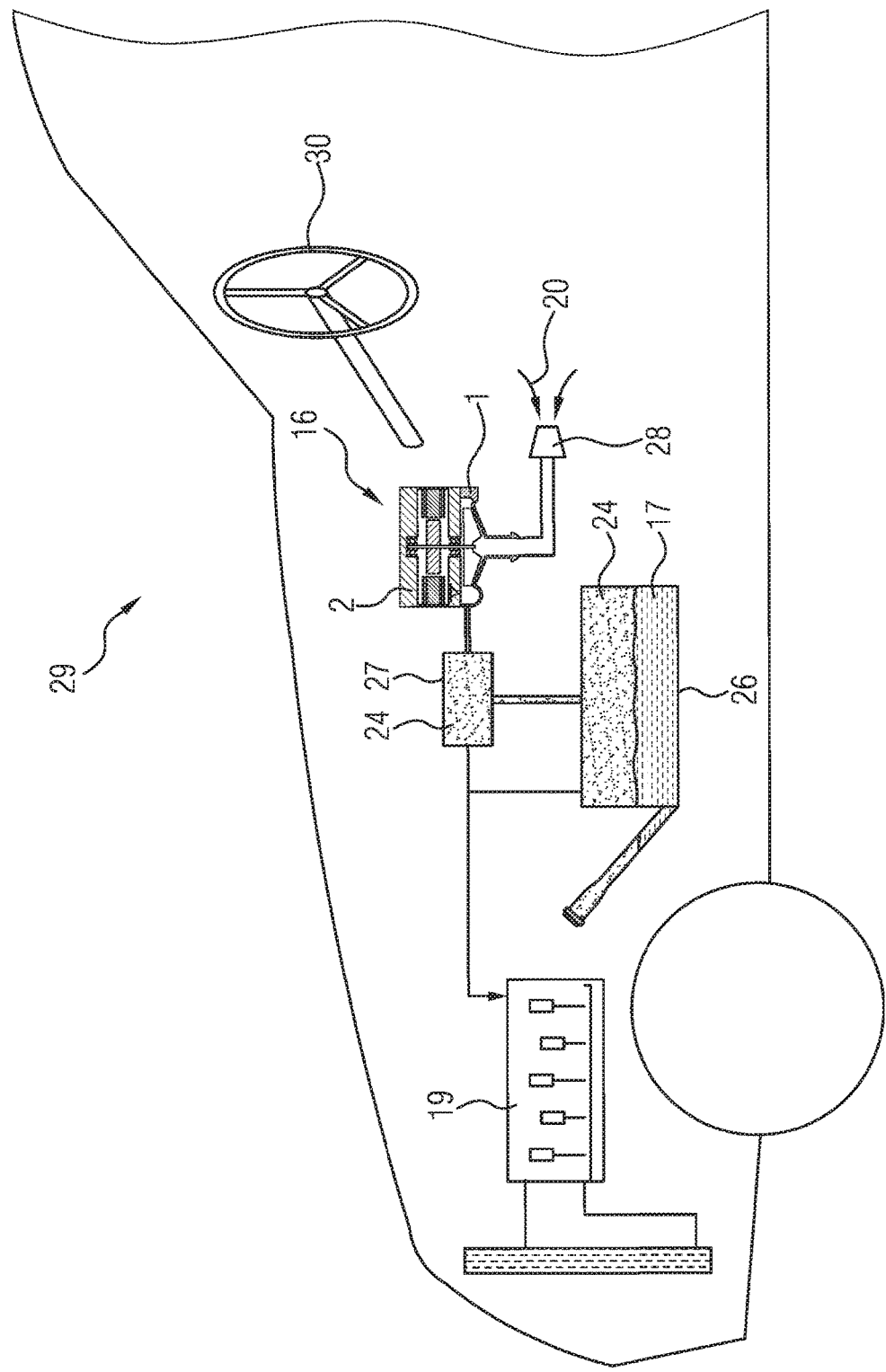
FIG. 4 is a diagram of a vehicle having a fuel tank system which includes an electrically driven pump, according to embodiments of the present invention.

FIG. 4 depicts by way of example the arrangement of the inventive electrically driven pump 16 in a motor vehicle 29. A steering wheel 30 is indicated in the motor vehicle 29. The electrically driven pump 16 is part of a fuel tank system that is formed here at least from a fuel tank 26, which is filled with fuel 17, and a storage element 27 for the storage of volatile hydrocarbons 24. It is seen that the electrically driven pump is embodied as a purge air pump 16. Purge air may be aspirated through the purge air filter 28 with the help of the purge air pump 16 and forced into the filled storage element 27, as a result of which hydrocarbons 24 are conveyed via the lines to the intake system of the internal combustion engine 19. The installed position of the electrically driven pump 16 for gases or gas mixtures is shown in FIG. 4. It may be appreciated that the pump housing 1 must be disposed in each case underneath the motor housing 2. Also, as a result, no liquid or solid bodies are able to enter the motor housing 2 in the event of the stoppage of the purge air pump 16.

Figure 5:
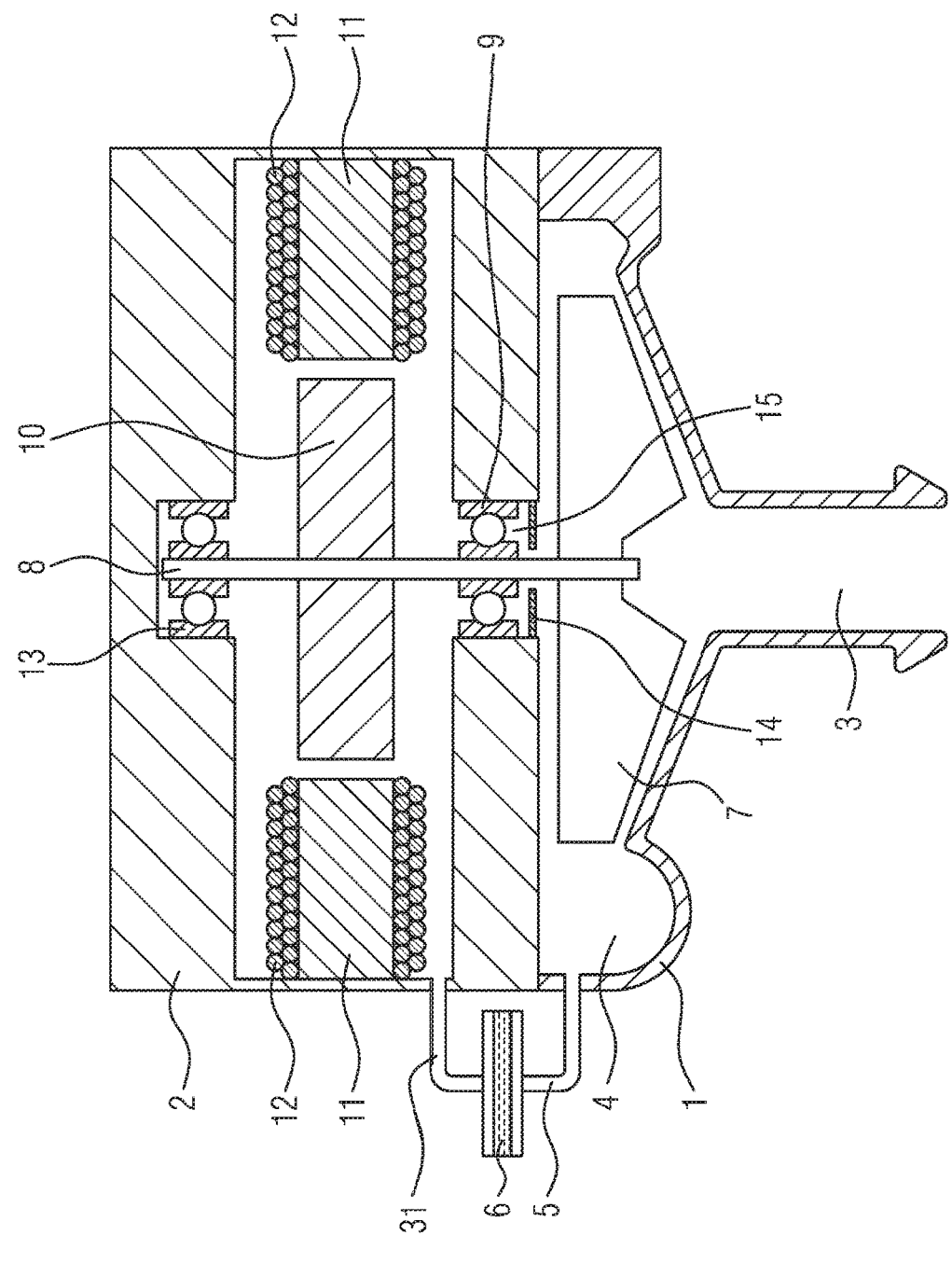
FIG. 5 is a sectional view of an alternate embodiment of an electrically driven pump, according to embodiments of the present invention.

FIG. 5 depicts an embodiment of the inventive electrically driven pump 16 for gases or gas mixtures. It may be seen here that the opening 5 is configured as a bypass 31, wherein the bypass 31 connects the pressure side 4 of the pump housing 1 to the interior of the motor housing 2. A filter element 6, which prevents the ingress of liquid or solid components from the gas or gas mixture into the interior of the motor housing 2, is also seen inside the bypass 31.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electrically driven pump for gases or gas mixtures, comprising:
   a pump housing having a wall;
   a motor housing connected to the pump housing;
   a radial pump having a pump impeller located in the pump housing;
   a drive shaft extending through a wall of the pump housing into the motor housing, the pump impeller being connected to the drive shaft, the drive shaft mounted in the motor housing with a first ball bearing;
   an annular disc disposed around the drive shaft;
   an electric motor;
   a rotor connected to the drive shaft, the rotor being part of the electric motor,
   at least one air gap located between the drive shaft and the wall of the pump housing;
   a pump inlet formed as part of the pump housing, the pump inlet being arranged in the central region of the pump impeller;
   a pressure side located in the pump housing, the pressure side being arranged in the outer radial region of the pump impeller;
   an opening extending through the pump housing in proximity to the pressure side, such that the opening places the interior of the pump housing in fluid communication with the interior of the motor housing; and
   a filter element covering the opening;
   wherein pressure prevailing on the pressure side in the pump housing is propagated through the opening into the interior of the motor housing;
   wherein the filter element prevents the ingress of liquids or solid bodies into the interior of the motor housing; and
   wherein an air gap is formed through openings between individual balls of the first ball bearing and the annular disc.

2. The electrically driven pump of claim 1,
   wherein the first ball bearing is arranged in the wall of the pump housing, the drive shaft being supported by the first ball bearing; and
   wherein the air gap extends between the balls of the first ball bearing.

3. The electrically driven pump of claim 1,
   wherein the annular disc connects to the wall of the pump housing, the drive shaft extending through the annular disc; and
   wherein the at least one air gap is formed between the drive shaft and the annular disc.

4. The electrically driven pump of claim 1, the opening further comprising a bore which extends through the wall of the pump housing.

5. The electrically driven pump of claim 1, the opening further comprising a bypass, wherein the bypass places the interior of the pump housing in fluid communication with the interior of the motor housing.

6. The electrically driven pump of claim 1, the electrically driven pump further comprising a purge air pump.

7. The electrically driven pump of claim 6, wherein the purge air pump is a component part of a fuel tank system in a motor vehicle.

* * * * *